3,020,165
LOW VISCOSITY GLASS COMPOSITIONS
Earl K. Davis, Ogden, N.Y., assignor to Bausch & Lomb Incorporated, a corporation of New York
No Drawing. Filed July 5, 1960, Ser. No. 40,508
3 Claims. (Cl. 106—54)

This invention pertains to novel glass compositions, and more particularly, but not necessarily exclusively, to novel glass compositions that are especially advantageous for cladding optical glass fibers.

One important object of the invention is to provide novel glass compositions that are especially advantageous for application to optical glass fibers for providing a relatively low refractive index coating upon the fibers, thereby to enhance the image transmission characteristics of groups, or bundles of the fibers.

Another object is to provide novel glass compositions which have relatively low refractive indices, relatively low temperature working ranges, relatively little color, and which may be readily applied in the form of relatively thin coatings to other glass bodies, particularly those having relatively low temperature melting characteristics.

Yet another object is to provide novel glass compositions of this character which have thermal expansion characteristics closely approximating the thermal expansion characteristics of glasses having relatively high refractive indices, so that the novel glasses may be applied in molten form as surface coatings upon the relatively high index glasses and cooled thereon without developing undesirable strains.

The glass compositions of the present invention fall generally within the following approximate composition ranges, percent by weight batch basis:

| | |
|---|---|
| $SiO_2$ | 35–45 |
| $Al_2O_3$ | 0–5 |
| Total $Al_2O_3 + SiO_2$ | 40–50 |
| $Na_2O$ | 5–9 |
| $Li_2O$ | 2–5 |
| $KHF_2$ | 5–9 |

At least one of:

| | |
|---|---|
| CaO<br>ZnO<br>MgO<br>BaO | 1–2 |
| $B_2O_3$ | 30–40 |
| $Sb_2O_3$ | 0–1 |

They may be produced by conventional means, melting the ingredients, preferably in a clay pot, and fining at about 2500° F. After fining, the glasses may be cooled to the working temperature of between about 1700° F. and 1900° F. for dip application to relatively high index glass fibers, if the glasses are to be so used. Alternatively, the glasses of the invention may be cooled after fining to a temperature of about 1700° F. to 1800° F., and cast at this temperature.

One particular glass composition of the present invention, which has been found particularly advantageous for dip application to fibers of relatively high index flint glass is as follows, batch basis:

Example I

| | Wt. percent |
|---|---|
| $SiO_2$ | 40.0 |
| $Na_2O$ | 7.5 |
| $Li_2O$ | 3.0 |
| $KHF_2$ | 8.0 |
| CaO | 1.5 |
| $B_2O_3$ | 39.06 |
| $Sb_2O_3$ | 0.94 |

This glass has a softening point of about 1065° F. It has been found to conform closely to the thermal expansion characteristics of a flint glass of the following batch composition:

| | Parts by weight |
|---|---|
| $SiO_2$ | 42.5 |
| $K_2O$ | 7.06 |
| PbO | 48.6 |
| $TiO_2$ | 1.46 |
| $ZrO_2$ | 0.25 |
| $As_2O_3$ | 0.28 |

This flint glass has a refractive index of about 1.649 and a softening temperature of about 1110° F. When the low index glass according to Example I is applied to glass fibers of the stated flint glass composition at temperatures ranging from about 1700° to 1900° F. it forms a coating on the flint glass of controllable thickness, and produces substantially no strain in the fibers upon cooling.

Flint glass fibers of this composition have been coated with the glass according to Example I using a concentric orifice pot, drawing the core fiber of the flint glass from the center orifice, and allowing the low index glass composition to flow through the annular orifice surrounding the central orifice.

In the actual pot used for this work, the central orifice was .060" in diameter, and the surrounding annular orifice and an I.D. of 0.160" and an O.D. of 0.180". The thickness of the coating may be readily controlled in this process by varying the temperature and the rate at which the material is drawn. A clad fiber may be drawn having an overall diameter of 30 microns, a core diameter of about 24–26 microns and a coating thickness of 2–3 microns by drawing the fiber from the concentric orifice at about 700 ft. per minute while maintaining the two batches of glass at a temperature of about 1750° F.

Fibers about 200 microns in diameter, and having a cladding thickness of about 4–6 microns may be drawn from the same pot by reducing the tension and increasing the temperature so that the fibers are drawn at the rate of about 100–125 feet per minute, with the melts held at a temperature of about 1825° F. Conversely, relatively thin fibers about 15 microns in diameter and having a cladding thickness of about 2–3 microns may be drawn at a rate of about 1400 feet per minute with the temperature of the melts reduced to about 1720° F.

A second illustrative composition according to the invention is as follows, batch basis:

Example II

| | Parts by weight |
|---|---|
| $SiO_2$ | 45.27 |
| $Al_2O_3$ | 1.00 |
| $K_2O$ | 3.00 |
| $Na_2O$ | 8.64 |
| $Li_2O$ | 2.00 |
| $KHF_2$ | 8.00 |
| CaO | 1.29 |
| $B_2O_3$ | 29.86 |
| $Sb_2O_3$ | .94 |
| $n_D$ | 1.523 |
| Softening point | 591° C. |

This glass has been found particularly advantageous for cladding a high index flint glass of the following analysis:

| | |
|---|---:|
| $SiO_2$ | 33.70 |
| PbO | 58.69 |
| $Al_2O_3$ | 0.67 |
| $TiO_2$ | 1.14 |
| MgO | .10 |
| $Na_2O$ | 1.92 |
| $K_2O$ | 2.40 |
| $F_2$ | 1.00 |
| $Li_2O$ | 0.28 |
| $As_2O_3$ | 0.50 |
| | 100.40 |
| $O_2$ equivalent of $F_2$ | −.42 |
| | 99.98 |
| $n_D$ | 1.728 |
| Softening point | 534° C. | having an expansion characteristic of about $8.9 \times 10^{-6}$ cm./cm./° C. over the range of 25° C. to 420° C. The cladding glass according to the second batch composition may be applied to this and other core glasses of similar nature in exactly the same manner as hereinabove described in connection with the cladding glass of the first example.

The glasses of the invention all have refractive indices close to 1.520. Adjustments in their expansion characteristics to conform them to the characteristics of the particular base body or core glass to which they are intended to be applied may be made by appropriately varying their compositions. It is also important to control the viscosity of the glasses in order to achieve proper control of the cladding thicknesses when they are to be used for cladding glass fibers. In general, in order to increase the expansion coefficient, the proportion of alkali, or fluorine, or both should be increased, and to reduce the expansion coefficient, less alkali or less fluorine should be used, all within the ranges hereinabove specified. The relative proportions of boric acid and silica are adjusted to control the viscosity without appreciably changing the expansion characteristic. The viscosity is reduced by substituting boric acid for silica, and conversely, the viscosity may be increased by substituting silica for part of the boric acid.

Preferably, the compositions of the present invention are melted in a clay pot in order to minimize devitrification tendencies and to provide maximum stability. If the compositions are melted in a platinum or other precious metal pot, it may be necessary to add relatively small proportions such as about 1% by weight of alumina to insure against devitrification, particularly in those cases where the glass is to be cast rather than applied as a coating to other bodies.

What is claimed is:

1. A glass composition consisting essentially of the following ingredients, percent by weight, batch basis:

| | |
|---|---:|
| $SiO_2$ | 35–45 |
| $Al_2O_3$ | 0–5 |
| Total $Al_2O_3 + SiO_2$ | 40–50 |
| $Na_2O$ | 5–9 |
| $Li_2O$ | 2–5 |
| $KHF_2$ | 5–9 |

At least one material selected from the group consisting of:

| | |
|---|---:|
| CaO, ZnO, MgO, BaO | 1–2 |
| $B_2O_3$ | 30–40 |
| $Sb_2O_3$ | 0–1 |

2. A glass composition consisting essentially of the following ingredients, percent by weight, batch basis:

| | |
|---|---:|
| $SiO_2$ | 40.0 |
| $Na_2O$ | 7.5 |
| $Li_2O$ | 3.0 |
| $KHF_2$ | 8.0 |
| CaO | 1.5 |
| $B_2O_3$ | 39.06 |
| $Sb_2O_3$ | 0.94 |

3. A glass composition consisting essentially of the following ingredients, percent by weight, batch basis:

| | |
|---|---:|
| $SiO_2$ | 45.27 |
| $Al_2O_3$ | 1.00 |
| $K_2O$ | 3.00 |
| $Na_2O$ | 8.64 |
| $Li_2O$ | 2.00 |
| $KHF_2$ | 8.00 |
| CaO | 1.29 |
| $B_2O_3$ | 29.86 |
| $Sb_2O_3$ | .94 |

References Cited in the file of this patent

UNITED STATES PATENTS

| | | |
|---|---|---|
| 1,969,277 | Pirani | Aug. 7, 1934 |
| 2,517,459 | Armistead | Aug. 1, 1950 |
| 2,629,161 | Kistler | Feb. 24, 1953 |